US012174636B2

(12) United States Patent
Mansell et al.

(10) Patent No.: US 12,174,636 B2
(45) Date of Patent: Dec. 24, 2024

(54) ASPHALT COMPACTOR PASS PLANNING

(71) Applicant: Caterpillar Paving Products Inc., Brooklyn Park, MN (US)

(72) Inventors: Todd W. Mansell, Rogers, MN (US); Jonathan A. Anderson, Maple Grove, MN (US); Toby A. Frelich, Saint Michael, MN (US); John L Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 355 days.

(21) Appl. No.: 17/699,527

(22) Filed: Mar. 21, 2022

(65) Prior Publication Data
US 2023/0297117 A1 Sep. 21, 2023

(51) Int. Cl.
G05D 1/02 (2020.01)
B62D 6/00 (2006.01)
E01C 19/26 (2006.01)
G05D 1/00 (2006.01)

(52) U.S. Cl.
CPC ........... *G05D 1/0219* (2013.01); *B62D 6/001* (2013.01); *E01C 19/26* (2013.01); *G05D 1/0278* (2013.01)

(58) Field of Classification Search
CPC .... G05D 1/0219; G05D 1/0278; G05D 1/648; G05D 2105/05; G05D 2107/90; G05D 2109/90; G05D 2109/10; G05D 1/248; B62D 6/001; E01C 19/26; E01C 19/004; E01C 19/48; E01C 19/28; E01C 19/23; G01S 19/42
See application file for complete search history.

(56) References Cited

U.S. PATENT DOCUMENTS

| 8,930,092 B2* | 1/2015 | Minich .................... E01C 19/23 701/2 |
| 9,447,549 B2 | 9/2016 | Buschmann et al. |
| 9,759,708 B2 | 9/2017 | Marsolek et al. |
| 10,480,131 B1* | 11/2019 | McAlpine ............. E01C 19/004 |
| 10,920,381 B2 | 2/2021 | Marsolek |
| 10,963,148 B2 | 3/2021 | Marsolek |
| 11,111,644 B2 | 9/2021 | Marsolek et al. |
| 2013/0290062 A1* | 10/2013 | Patel ................. G06Q 10/06313 705/7.23 |
| 2016/0222602 A1* | 8/2016 | Downing .............. G05D 1/0246 |
| 2017/0010621 A1* | 1/2017 | Rio .......................... B60T 7/00 |
| 2017/0292232 A1* | 10/2017 | Marsolek ................ E01C 23/14 |
| 2019/0106846 A1* | 4/2019 | Marsolek ......... G08G 1/096708 |
| 2020/0050197 A1* | 2/2020 | O'Donnell ........... G05D 1/0278 |
| 2021/0010210 A1* | 1/2021 | Ellwein .................. E01C 19/48 |

(Continued)

FOREIGN PATENT DOCUMENTS

| CN | 109024200 | 12/2018 |
| CN | 212752297 | 3/2021 |

*Primary Examiner* — Mussa A Shaawat

(57) ABSTRACT

A system for controlling a compactor machine can include a first GPS receiver on one side of a screed of a paver machine and a second GPS receiver on a second side of the screed, the first and second GPS receivers configured to communicate location information of the first and second sides of the screed, respectively, to a compactor machine; and a controller configured to receive the location information from screed and define a pass pattern for the compactor machine in view of the location information.

20 Claims, 2 Drawing Sheets

(56) References Cited

U.S. PATENT DOCUMENTS

2021/0148063 A1* 5/2021 Repiscak .............. E01C 23/065
2021/0215543 A1    7/2021 Keyes et al.
2021/0324587 A1* 10/2021 Marsolek .............. B60W 30/09

* cited by examiner

ASPHALT COMPACTOR PASS PLANNING

TECHNICAL FIELD

This disclosure relates to road construction equipment, and more specifically to a system and method for controlling an asphalt compactor.

BACKGROUND

In a paving operation, an asphalt paving machine lays down an asphalt mat which is then gone over by one or more compactors. At a worksite a plurality of machines can perform a variety of tasks that may be controlled by a combination of on-board and off-board computers, processors, and other electronic controllers along with human operators. Construction site planning for construction vehicles involves determining the path a construction vehicle will take.

For example, a compaction planning system executes the compacting process in the most technically correct way to achieve desired compaction. However, in order for a compactor pass planning system to calculate the required compaction patterns the system needs to have a plan of where the asphalt mat is in 3-D space.

U.S. Pat. No. 11,111,644 discusses a method of generating a compaction plan based on a location of the perimeters of the worksite.

SUMMARY

In an example according to this disclosure, a system for controlling a compactor machine can include a first GPS receiver on one side of a screed of a paver machine and a second GPS receiver on a second side of the screed, the first and second GPS receivers configured to communicate location information of the first and second sides of the screed, respectively, to a compactor machine; and a controller configured to receive the location information from screed and define a pass pattern for the compactor machine in view of the location information.

In another example, a compactor machine can include a frame; one or more drums attached to the frame; and a controller configured to provide an auto-steering capability for the compactor machine, the controller further configured to receive information from a corresponding paver machine regarding a location and outer boundaries of an asphalt mat laid down by the paver machine, wherein the controller is configured to plan a compaction route for the compactor machine based on the location information from the paver machine.

In another example, a method for controlling a compactor machine can include sending location information to a controller of the compactor machine regarding a location of an outer boundaries of an asphalt mat; and planning a compaction route for the compactor machine in view of the location of the outer boundaries.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
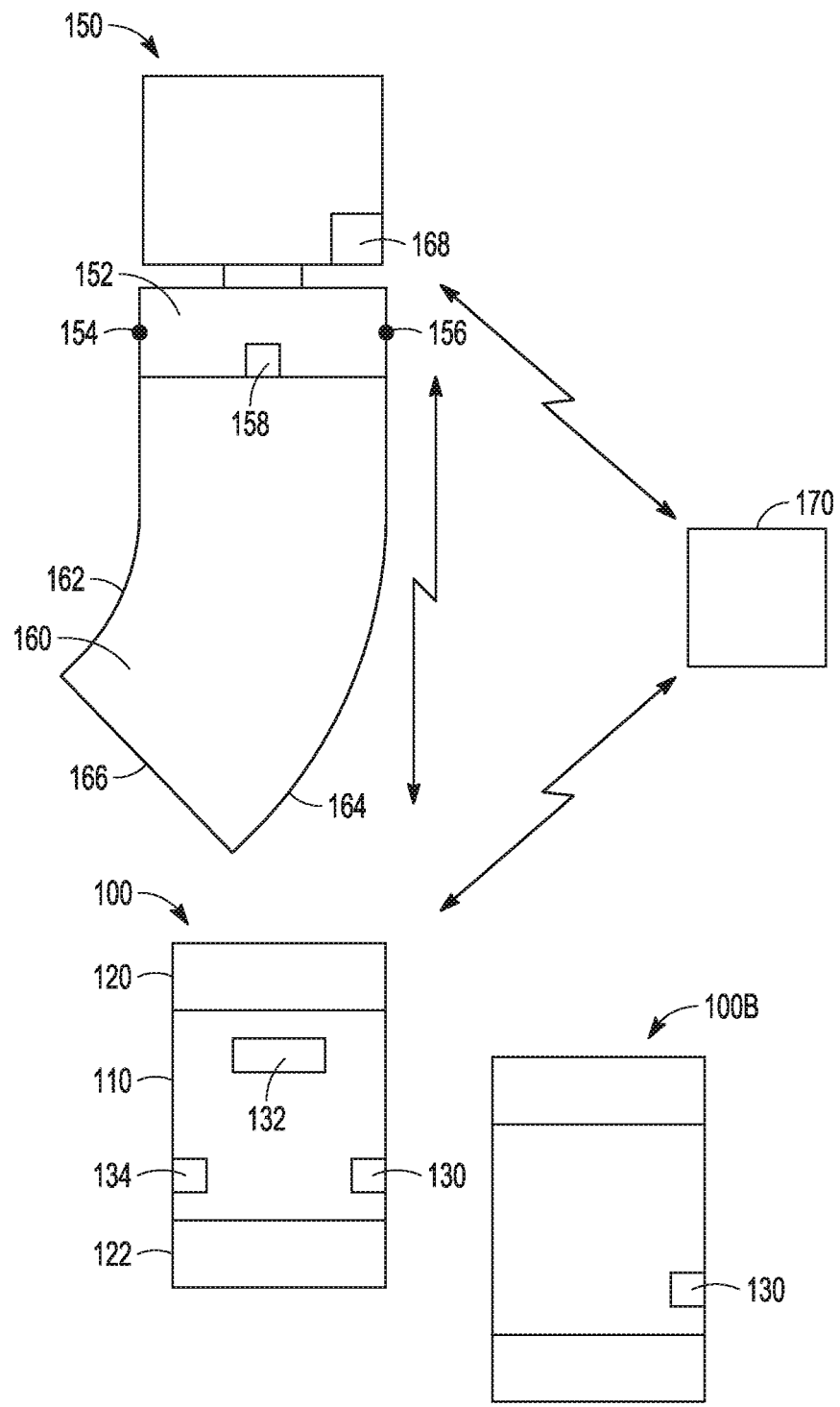
FIG. 1 shows a schematic view of a paving operation, in accordance with one embodiment.

FIG. 1 shows a schematic view of a paving operation including a paver machine 150 and a compactor machine 100, in accordance with one embodiment.

Here the paver machine 150 includes a screed 152 and lays down an asphalt mat 160. The compactor machine 100 generally includes a body or machine frame 110 that connects and associates the various physical and structural features that enable the compactor machine 100 to function. To propel the compactor machine 100 over a surface, a power system such as an internal combustion engine can also be mounted to the machine frame 110 and can generate power that is converted to physically move the machine.

Compactor machine 100 can include at least one cylindrical roller drum 120 which is rotatable about a drum axis oriented generally transverse to a direction of travel of the compactor machine 100. Some examples, include a second roller drum 122.

In this example, the compactor machine 100 can travel over a surface compacting a work material, for example, asphalt. Other types of compactors are contemplated to implement the disclosed process including soil compactors and vibratory compactors, for example. Moreover, the compactor machine can include either one or two roller drums.

As noted above, in order for a compactor pass planning system to calculate the required compaction patterns the system needs to have a plan of where the asphalt mat 160 is in 3-D space.

The present paving system does this by accurately measuring where the asphalt paver machine 150 places the mat 160 and then passing that information to the compactor machine 100.

For example, the present system can include a first GPS receiver 154 on one side of a screed 152 and a second GPS receiver 156 on a second, opposite side of the screed 152. The first and second GPS receivers 154, 156 can be configured to communicate location information of the first and second sides of the screed 152, respectively, to a compactor machine 100. The outer boundary of the screed 152 at that location lets the compactor machine 100 know the outer edges 162, 164 of the asphalt mat 160. The first and second GPS receivers 154, 156 can be RTK (real-time kinetic) enabled GPS receivers. These provide increased accuracy.

In one embodiment, a controller 130 on the compactor machine 100 can receive the GPS locations from the paver machine 150 and define a pass pattern for the compactor machine 100 in view of the location information.

In some examples, an off-board central controller 170 can relay the boundary information or specific steering instructions to the machine controller 130. For example, the location information can be sent to a central controller 170 from the paver machine 150, and then communicated to the compactor machine 100.

Thus, if the screed 152 changes its width (and thus the width the asphalt mat), the location of the various widths of the asphalt mat 160 can be known due to the GPS information from the edges of the screed 152 defining the outer edges of the mat 160. If the asphalt mat 160 defines a curved path as in FIG. 1, the exact contours of the path can be known since the outer edges 162, 164 of the asphalt mat 160 are known for every location. Also, the information of the location of a starting edge 166 of the mat and an ending edge can be sent to the controller 130. Thus, the complete boundary of the asphalt mat 160 can be determined and delivered to the compactor machine 100 so that a pass pattern for the compactor machine 100 can be developed.

In one example, the compactor machine 100 can include one or more GPS receivers 134 so that the controller 130 knows the location of the compactor machine 100 relative to the work site.

The compactor machine 100 can include a steering system 132 including various mechanisms and controls for steering and/or otherwise operating the compactor machine 100. In such examples, the various components of the steering system may be connected to one or more actuators, a throttle of the compactor machine 100, an engine of the compactor machine 100, a braking assembly, and/or other such compactor machine components, and the steering system 132 may be used to adjust a speed, travel direction, and/or other aspects of the compactor machine 100 during use. In one example, the compactor machine 100 can include an auto-steer system where the controller 130 communicates instructions to the steeling system 132 and thus can control the steering and location and position of the compactor machine 100. In some embodiments, the compactor machine 100 can include an autonomous or semi-autonomous compactor machine.

In a further example, a temperature sensor 158 can be placed on the screed 152. The temperature sensor 158, along with the GPS receivers 154, 156, can be used to determine a positional temperature of the asphalt mat 160 passed over by the screed 152. This information can also be communicated to the controller 130, 170 and the compactor machine 100. The system passes the temperature the mat 160 was laid at so the compactor machine 100 can plan when to do the compaction so that it can avoid compacting in the wrong zone temperature of the asphalt mat 160. The temperature information can be time-stamped and location-stamped so the controller 130, 170 can determine the proper window of time for compacting and direct the compactor machine 100 accordingly. The temperature sensor 158 can include a thermal camera such that the positional temperature of the mat can be passed to the pass planning and/or auto-steer enabled compactor machine 100.

In some examples, the paving operation can include a compaction train including a plurality of additional compactor machines, such as a compactor machine 100B. In some examples, each additional compactor machine 100B can include similar features as compactor machine 100. In this example, each compactor machine in the compactor train can include a controller 130 to receive the boundary information from the paver machine 150 or from the central controller 170. In some examples, the location information can be passed from compactor machine 100 to compactor machine 100B, and so on, along the compaction train. The controllers 130, 170 can then plan the compaction routes of all compactors in the train such that optimum mat compaction can be attained.

Figure 2:
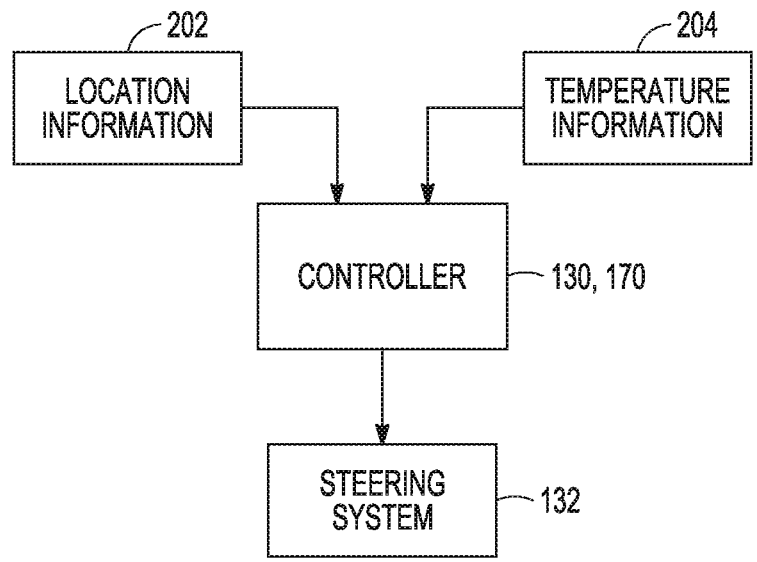
FIG. 2 shows schematic view of a compactor control system, in accordance with one embodiment.

FIG. 2 shows schematic view of a compactor control system for controlling the compactor machine 100, in accordance with one embodiment.

In this example, the controller 130, 170 can be configured to provide an auto-steering capability for the compactor machine 100 by sending instructions to the steering system 132. The controller 130, 170 can further be configured to receive location information 202 from a corresponding paver machine regarding the location and outer boundaries of an asphalt mat laid down by the paver machine. The controller 130, 170 can be configured to plan a compaction route for the compactor machine based on the location information 202 from the paver machine.

In one example, the controller 130, 170 can further receive positional temperature information 204 of the asphalt mat from the paver machine.

As noted, the compactor machine 100 can include an autonomous or semi-autonomous compactor machine. For example, the controller 130 on the compactor machine 100 can operate a steering of the compactor machine 100 and plan a compaction route in view of the location information. Or, as noted, the compaction route and steering instructions can be formed at a central controller 170 and then transferred to the on-board controller 130.

In one embodiment, the vehicle controller 130 may be an electronic controller that performs operations, executes control algorithms, stores, and retrieves data and other desired operations. The vehicle controller 130 may include, or access, memory, secondary storage devices, processors, and any other components for running an application. The memory and secondary storage devices may be in the form of read-only memory (ROM) or random-access memory (RAM) or integrated circuitry that is accessible by the controller.

The vehicle controller 130 may be a single controller or may include more than one controller disposed to control various functions and/or features of the compactor machine 100. The term "controller" is meant to be used in its broadest sense to include one or more controllers and/or microprocessors that may cooperate in controlling various functions and operations of the compactor machine 100. The functionality of the controller 130 may be implemented in hardware and/or software without regard to the functionality.

External controller 170 can also include or access memory, secondary storage devices, processors, and any other components for running an application. Control of the compactor machine 100 may be implemented in any number of different arrangements. For example, all control can be done by the vehicle controller 130, or control can be at least partially implemented at external controller 170 situated locally and/or remotely relative to the construction site with sufficient means for communicating with the compactor machine 100, via any of a variety of wireless communication systems, for example via a satellite, or the like. Using any of the foregoing arrangements, external controller 170 may generally be configured to monitor the position of the compactor machine 100 relative to the construction site and a predetermined target compaction operation and provide instructions for controlling the compactor machine 100 in an efficient manner to compact the surface. In at least one example, the external controller 170 may wirelessly communicate a construction site plan to the vehicle controller 130.

Compactor machine 100 may be configured to be operated autonomously, semi-autonomously, or manually. When operating semi-autonomously or manually, the compactor machine 100 may be operated by remote control and/or by an operator physically located within the cab.

INDUSTRIAL APPLICABILITY

The present system is applicable during many situations in road construction. For example, the present system can be used for defining pass patterns for a compactor machine or other construction equipment.

Figure 3:
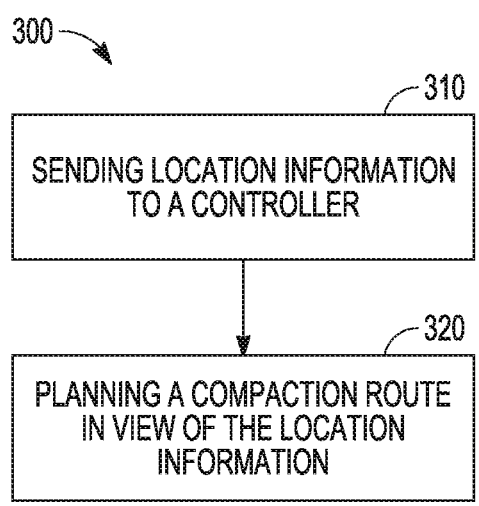
FIG. 3 shows a method for controlling a compactor machine, in accordance with one embodiment.

FIG. 3 shows a method (300) for controlling a compactor machine for planning a compaction route. The method (300) can include sending location information (310) to a controller of the compactor machine regarding a location of an outer boundaries of an asphalt mat; and planning a compaction route (320) for the compactor machine in view of the location of the outer boundaries.

The location information can include sending location information from a first GPS receiver on one side of a screed and a second GPS receiver on a second side of the screed, defining a width and an outer boundary of an asphalt mat. The first and second GPS receivers can be RTK enabled GPS receivers.

In the method, planning the compaction route (320) can include defining a pass pattern for the compactor machine. In one example, the compactor machine can include an auto steer system and planning the compaction route includes providing steering instructions to the steering system.

In some embodiments, the method can further include sending a positional temperature of the asphalt mat to the compactor machine. This allows for controlling the compactor machine to compact the asphalt mat within a predetermined window of time based on the positional temperature of the asphalt mat.

The method can further include sending the location information of the asphalt mat to a compactor train including a plurality of compactor machines.

In summary, in order for a compactor pass planning system to calculate the required compaction patterns the system needs to have a plan of where the asphalt mat is in 3-D space. This could be done by accurately measuring where the asphalt paver machine 150 places the mat 160 and then passing that information to the compactor machine 100 having auto-steering and pass planning capabilities. The system could also pass the temperature the mat 160 was laid at so the compactor machine 100 can plan when to do the compaction so that it could avoid compacting in the wrong zone temperature of the asphalt mat 160.

In one example, the system places an RTK enabled GPS receiver on the outside of each edge of the paver screed so that the outer boundaries of the asphalt mat are passed to the pass planning and/or auto steer-enabled compactor or compaction train, i.e., more than one compactor working to compact the mat. This information can also be tied in with a temperature sensor, such as a thermal camera, such that the positional temperature of the mat is also passed to the pass planning and auto-steer enabled compaction train. The compaction train would then plan the compaction routes of all compactors in the train such that optimum mat compaction was attained.

For the purposes of this disclosure, "autonomous" means both "autonomous and "semi-autonomous" such that an autonomous construction vehicle may include a fully autonomous construction vehicle or semi-autonomous construction vehicle which is controlled by a predetermined construction site plan designating the path that the construction vehicle is to take within a worksite boundary. In some examples, "autonomous" may include vehicles with an operator in the vehicles for a manned operation.

Various examples are illustrated in the figures and description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A system for controlling a compactor machine, comprising:
 a first GPS receiver on one side of a screed of a paver machine and a second GPS receiver on a second side of the screed, the first and second GPS receivers configured to communicate location information of the first and second sides of the screed, respectively, to a compactor machine;
 a temperature sensor on the screed, the temperature sensor configured to determine a positional temperature of an asphalt mat passed over by the screed; and
 a controller configured to receive the location information from the first and the second GPS receivers on the screed and to receive the positional temperature from the temperature sensor and configured to define a pass pattern for the compactor machine in view of the location information and the positional temperature.

2. The system of claim 1, wherein the compactor machine includes an auto steer system.

3. The system of claim 1, wherein the positional temperature includes time-stamped and location-stamped temperature information of the asphalt mat and the controller is configured to determine a proper window of time for compacting the asphalt mat in view of the time-stamped and location-stamped information.

4. The system of claim 1, wherein the location information is communicated to a compactor train including a plurality of compactor machines.

5. The system of claim 1, wherein the location information is sent to a central server and then communicated to the compactor machine.

6. The system of claim 1, wherein the compactor machine includes an autonomous or semi-autonomous compactor machine.

7. The system of claim 1, wherein a controller on the compactor machine operates a steering of the compactor machine and plans a compaction route in view of the location information.

8. The system of claim 1, wherein the first and second GPS receivers are RTK enabled GPS receivers.

9. A compactor machine comprising:
 a frame;
 one or more drums attached to the frame; and
 a controller configured to provide an auto-steering capability for the compactor machine, the controller further configured to receive information from a corresponding paver machine regarding a location and outer boundaries of an asphalt mat laid down by the paver machine and to receive a positional temperature of the asphalt mat from the paver machine, wherein the controller is configured to plan a compaction route for the compactor machine based on the location information and the positional temperature received from the paver machine.

10. The compactor machine of claim 9, wherein the positional temperature includes time-stamped and location-stamped temperature information of the asphalt mat and the controller is configured to determine a proper window of time for compacting the asphalt mat in view of the time-stamped and location-stamped temperature information.

11. The compactor machine of claim 9, wherein the compactor machine includes an autonomous compactor machine.

12. The compactor machine of claim 9, wherein the compactor machine is one of a plurality of compactor machines in a compaction train.

13. A method for controlling a compactor machine, comprising:
sending location information to a controller of the compactor machine regarding a location of an outer boundaries of an asphalt mat;
sending a positional temperature of the asphalt mat to the controller; and
planning a compaction route for the compactor machine in view of the location of the outer boundaries and the positional temperature of the asphalt mat.

14. The method of claim 13, where sending information includes sending information from a first GPS receiver on one side of a screed and a second GPS receiver on a second side of the screed.

15. The method of claim 14, wherein the first and second GPS receivers are RTK enabled GPS receivers.

16. The method of claim 13, wherein planning the compaction route includes defining a pass pattern for the compactor machine.

17. The method of claim 13, wherein the compactor machine includes an auto steer system and planning the compaction route includes providing steering instructions to the steering system.

18. The method of claim 13, wherein the positional temperature includes time-stamped and location-stamped temperature information of the asphalt mat.

19. The method of claim 18, further including controlling the compactor machine to compact the asphalt mat within a pre-determined window of time based on the positional temperature of the asphalt mat.

20. The method of claim 13, including sending the location information to a compactor train including a plurality of compactor machines.

* * * * *